United States Patent [19]

Irwin et al.

[11] Patent Number: 4,621,361

[45] Date of Patent: Nov. 4, 1986

[54] COMMUNICATION SWITCHING SYSTEM

[75] Inventors: George F. Irwin, Kanata; Jalal Ebrahimi, Nepean, both of Canada

[73] Assignee: Jatel Communications Systems Ltd., Kanata, Canada

[21] Appl. No.: 525,660

[22] Filed: Aug. 23, 1983
(Under 37 CFR 1.47)

[51] Int. Cl.⁴ ............................................. H04J 3/02
[52] U.S. Cl. ...................................... 370/85; 370/67
[58] Field of Search .............. 370/85, 86, 67; 375/22, 375/24; 340/825.44

[56] References Cited

U.S. PATENT DOCUMENTS

| | | | |
|---|---|---|---|
| 3,757,050 | 9/1973 | Mizote | 370/85 |
| 3,779,321 | 12/1973 | Landwer et al. | 375/24 |
| 3,856,993 | 12/1974 | Closs et al. | 370/85 |
| 3,943,296 | 3/1976 | O'Neill | 370/85 |
| 4,227,178 | 10/1980 | Gergaud et al. | 370/85 |
| 4,287,590 | 9/1981 | Boute et al. | 370/67 |
| 4,393,497 | 7/1983 | Cantwell, Jr. | 370/86 |
| 4,398,287 | 8/1983 | Spencer | 370/85 |
| 4,402,073 | 8/1983 | Hammond | 375/22 |
| 4,430,742 | 2/1984 | Milleker et al. | 340/825.44 |
| 4,442,502 | 4/1984 | Friend et al. | 370/67 |
| 4,500,989 | 2/1985 | Dahod | 370/85 |
| 4,506,262 | 3/1985 | Vance et al. | 340/825.44 |

Primary Examiner—Douglas W. Olms
Assistant Examiner—Curtis Kuntz
Attorney, Agent, or Firm—Achmed N. Sadik

[57] ABSTRACT

A simple but versatile communication switching system suitable for air traffic control and the like applications is provided. The system utilizes a central pulse amplitude modulation bus, is modular in structure, and provides the time division multiplexed representations of the auxiliary circuit terminations, such as radio and trunk circuits, on the central bus for direct access by all modules.

12 Claims, 7 Drawing Figures

COMMUNICATION SWITCHING SYSTEM

FIELD OF THE INVENTION

The present invention relates to switching systems in general and to communication switching systems suitable for voice frequency bands in particular. More particularly still, it relates to a pulse amplitude modulation (PAM) and data switching system for interfacing a plurality of trunk, radio, and/or telephone circuits to a plurality of terminals. Such a system is suitable for air traffic control (ATC) and similar applications at a fraction of the cost of hitherto utilized systems. Pulse amplitude modulation, although not representing the state of the art, is a technique combining advantages of both analog and digital technologies found particularly effective for such small switching systems accommodating both voice frequencies and low speed data.

BACKGROUND OF THE INVENTION

Existing systems, such as Westinghouse's Terminal Communications Control Systems (TCCS) for airport traffic control applications, utilize pulse code modulation, time division multiplex (TDM) and digital signal processing. The TCCS system interfaces nine hotlines, thirty-six radios, seven ringdown trunks, six dial trunks, two communication system networks, up to thirty-five dial intercoms, and forty tape recorder channels. In terms of capability, the system is excellent for intended applications. However, the central switching and control equipment of the system consists of six bays of more than fifty cubic feet in volume. And while the size of equipment is not always a determinant of cost, it should be expected that a reduction in size would reduce the cost of manufacture, apart from other costs associated with the space occupied by the equipment.

In addition to disadvantages of size and cost, prior art systems are not easily expandable and the initial capital investment is often too high for certain applications. The primary reason for this is lack of modularity in the deisgn of both hard and software. Modularity of hardware and software would also have the advantage of efficient maintainability and easy expandability. System design would be simplified and reliability improved by means of multiple redundant modules at the interfaces. Continuous self checking should be used throughout. The core of a system ought to be a simple (therefore highly reliable) control module with dual redundancy.

Thus, an optimal system design would have the following characteristics:
 combine analog/digital techniques;
 possess modularity of hard/software;
 be continuously self-diagnosing; and
 have multiple redundancy.
Such a system is a flexible compromise. As will be seen from the details of the invention hereinafter described, the features and associated advantages of this system are:
 circuit oriented functions allow incremental additions to the processing power;
 flexibility within subsystem elements permits user interface modifications while ensuring continuing system integrity;
 system modularity based upon functional bus structures allows system configuration by selection of building blocks; and
 functional subsystems obey specific sets of rules thereby reducing development risk.

SUMMARY OF THE INVENTION

The basic system of the present invention consists of one or more remote terminals and central control equipment. The latter comprises terminal/trunk interfaces and a common control unit. The interfaces are subsystems which translate the external communication equipment to a network function internal to the control system. Each subsystem has a specific function designed to service a remote terminal, a radio circuit termination, a voice circuit termination, etc. In addition, the following two important features characterize the present system. Firstly, digital multiplex loops transfer both voice and control messages between functional circuit packs in the interfaces within the central control equipment. And secondly, all circuit terminations are fully available at the network bus, so that each interface has direct access to voice messages on all channels.

Further features of the present system are the partitioning of the hardware and software into building blocks (modularization), a selective redundancy for critical modules to provide "hot standby" capability for immediate reconfiguration, and periodic fault monitoring by means of system-integral test equipment to identify faulty circuit cards.

Two significant advantages flow from the above features and other aspects of the invention; namely, an order of magnitude reduction both in size and in cost.

In its broadest aspect, the present invention provides a communication switching system comprising:
 (a) a central multiple network bus;
 (b) common control means;
 (c) a plurality of interface means for interfacing at least one operator position terminal and a plurality of auxiliary circuit terminations to one another and with said common control means;
 (d) said central multiple network bus interconnecting said plurality of interface means according to periodically generated address codes; and
 (e) said plurality of interface means providing time division multiplexed representations of the associated auxiliary circuit termination on said central multiple network bus for direct access thereto by the other interface means.

In a narrower aspect of the invention, the central multiple network bus has the time division multiplexed representations multiplexed thereon as pulse amplitude modulation signals.

BRIEF DESCRIPTION OF THE DRAWINGS

The preferred embodiment of the present invention will now be described in conjunction with the annexed drawing figures in which.

DETAILED DESCRIPTION OF THE PREFERRED EMBODIMENT

Figure 1:
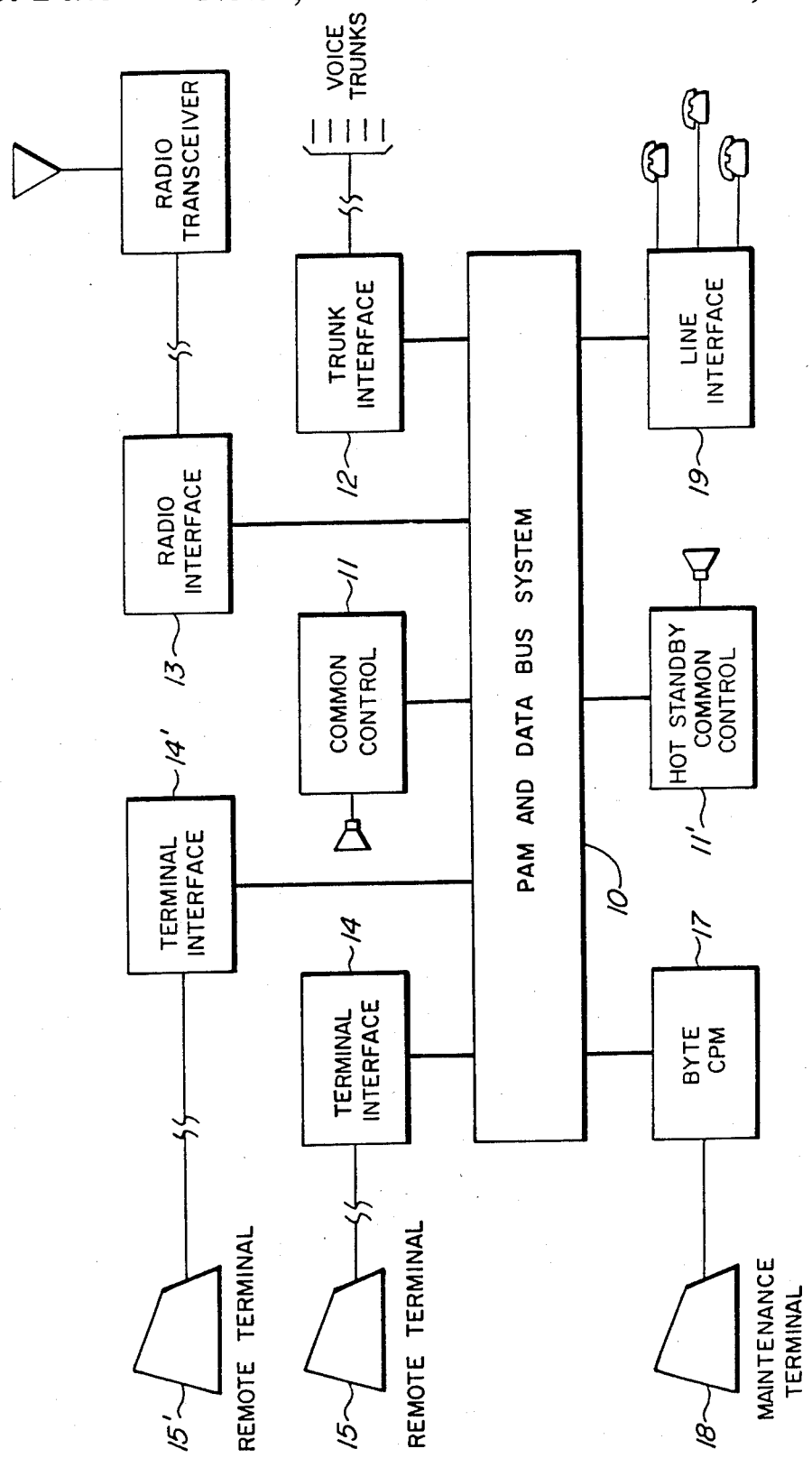
FIG. 1 is a block-diagram of the communication switching system according to the present invention.

Referring to FIG. 1 of the drawings, the switching system comprises a PAM and data bus system 10 (hereinafter the bus system 10), a common control 11 in continuous bilateral communication with the bus system 10, and a hot standby common control 11', which takes over control in case of failure of the common control 11. A trunk interface 12 is also in bilateral communication with the bus system 10 and interfaces it with a plurality of voice trunks, while a radio interface 13 similarly interfaces a radio transciever. Two terminal interfaces 14 and 14' similarly interface remote terminals 15 and 15', respectively, with the bus system 10. The bus system 10 transfers both control and voice messages between the devices 11 to 14. As will be explained later, the trunk and radio interfaces 12 and 13 provide on the bus system 10 time division multiplexed representations of the circuit denominations (i.e. voice trunks and so on) in the form of amplitude modulated pulses, so that all circuit terminations are available during the designated time-slots for direct access by system components. A Byte CPU 17 interfaces the bus system 10 to a maintenance terminal 18, while a line interface 19 interfaces a plurality of local telephones.

Figure 2:
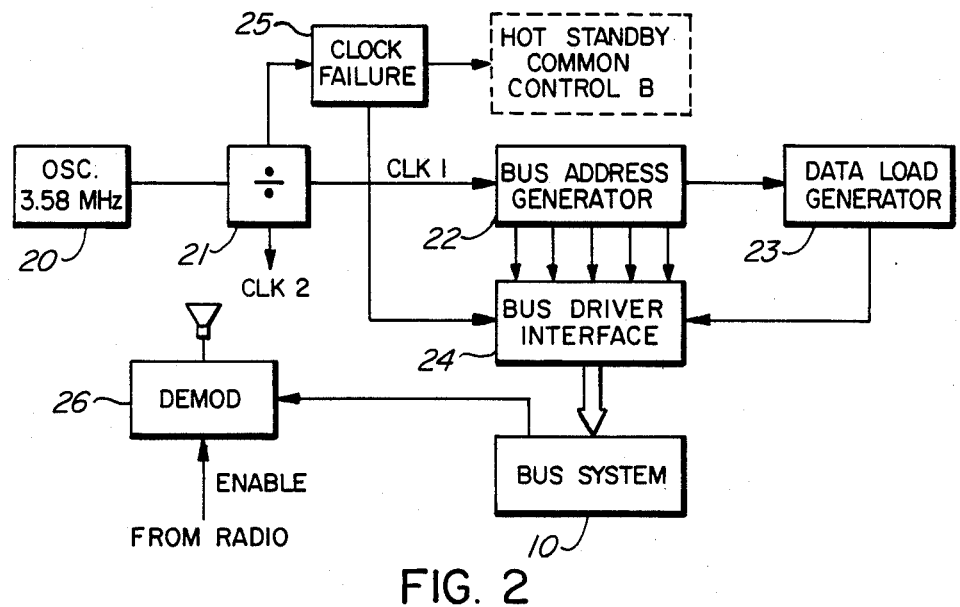
FIG. 2 is a block-diagram of the common control subsystem of the system of FIG. 1.

FIG. 2 shows the common control 11 in some detail. It is run under control of a 3.58 MHz clocking oscillator 20 which generates a two-phase master clock of 397.8 KHz nominal. Divider 21 shapes and provides a primary clock CLK1 which provides the basic timing functions to all devices that access the bus system 10 in order to synchronize all control, signalling and supervision functions to the primary clock CLK1. A delayed version CLK2 is also generated by the divider 21. The clock CLK1 drives a bus address generator 22 which is a twelve-state counter. It provides five address lines, which sequentially determine the time slot address that is active on the bus system 10. In addition, a nominal 100 Hz clock derived from the most significant bus (MSB) of the generator 22 periodically enables a data load generator 23. A bus driver interface 24 buffers the time-slot addresses generated in generator 22, the data load signal generated in generator 22, as well as the system clock CLK1 onto the bus system 10. As both the common controls 11 and 11' are running simultaneously, only the bus driver interface 24 is enabled to access the bus system 10, while the other bus driver interface 24' is disabled from access to the bus system 10 by a clock failure and activity control 25. In addition, the common control 24 comprises an audio demodulator 26 under control of an enable signal from the radio transceiver as any one of the radio channels becomes actual. The demodulator 26 then demodulates the PAM signal appearing on the bus system 10 and enunciates it over a room loudspeaker monitor.

Figure 3:
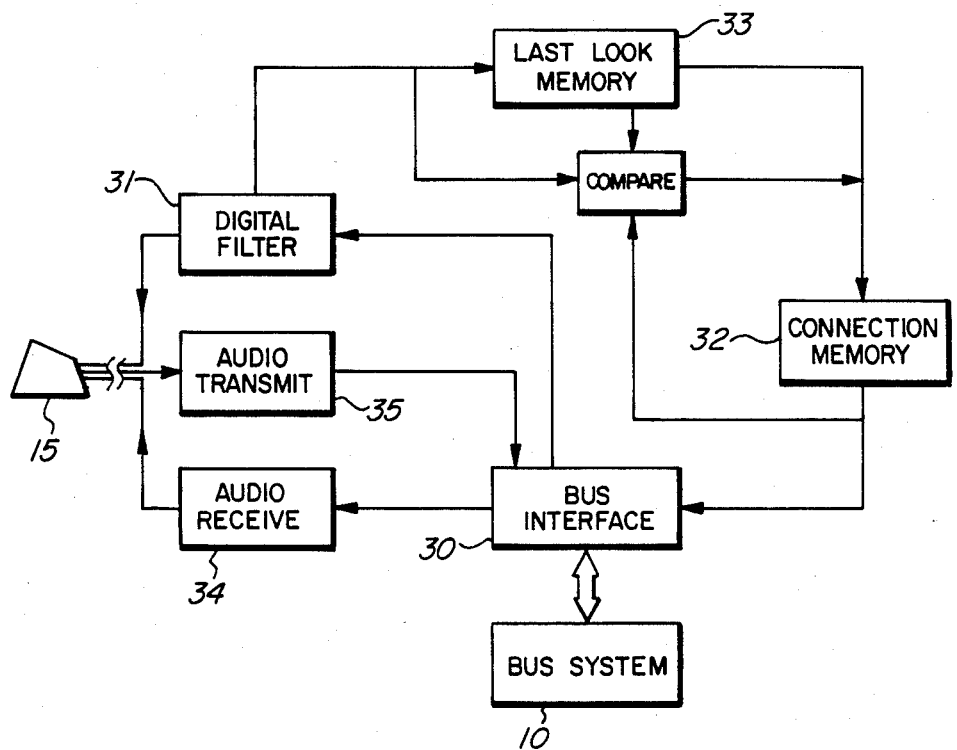
FIG. 3 is a block-diagram of the terminal interface subsystem of the system of FIG. 1.

Turning now to FIG. 3, the terminal interface 14 comprises analog and digital circuitry in order to interface a remote terminal 15 via its cable link to the system. The terminal interface 14 comprises a bus interface 30 interfacing the terminal 15 with the bus system 10. The bus interface 30 buffers the digital signals present at the bus system 10 to the remaining components of the terminal interface 14 by transplanting the high level signals on the bus 10 to low level logic signals latched according to the primary system clock CLK1, and vice versa for the outgoing signals. A digital filter 31 accepts received command flags as the received data address is matched against the bus system 10 address. However, the digital filter 31 requires two successive matching states to be received before it modifies a connection memory 32 to a new connection state. This is accomplished by writing error free incoming connection states into a last look memory 33 while the immediately previously received error-free connection state stored in the last look memory 33 is compared to the currently received connection state. When both these states are identical the serial output from the last look memory 33 is written into the connection memory 32, otherwise the latter's output is re-circulated to its input. Serial select flags from the connection memory 32 are continuously read in synchronism with the time slot address present at the bus interface 30. Each select flag determines whether or not corresponding TDM slot (channel) is accessed. The bus interface 30, in addition to buffering data and supervision signals, also buffers audio signals to and from audio receive 34 and audio transmit 35, respectively. Both receive and transmit audio signals are sampled from and transmitted onto the bus 10 in accordance with the connection memory 32 flags which designate the receive and transmit TDM time slots on the bus 10.

Figure 4:
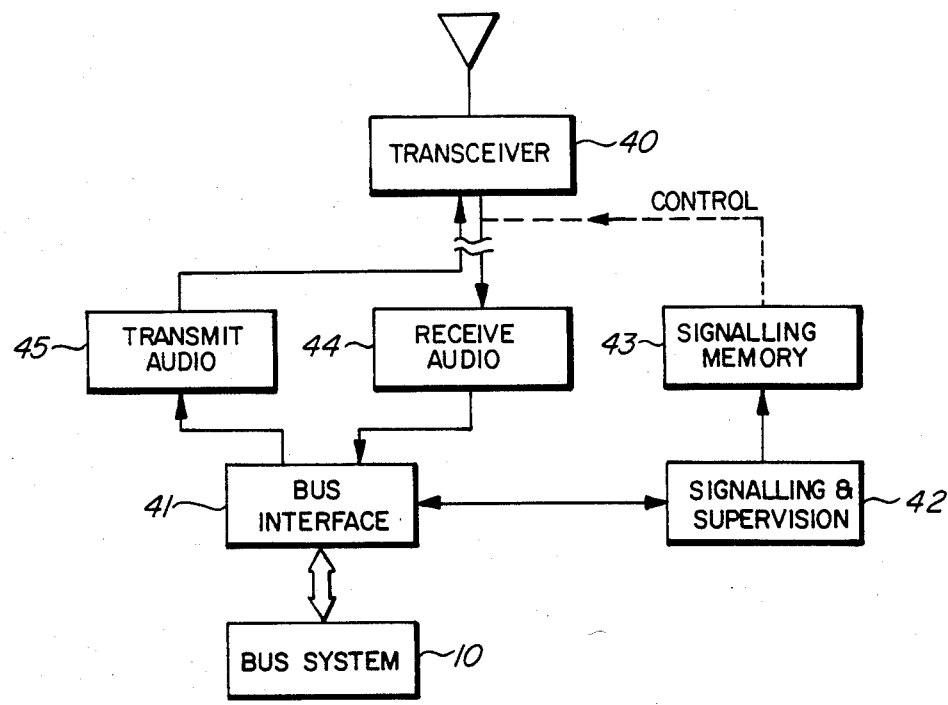
FIG. 4 is a block-diagram of the radio interface subsystem of the system of FIG. 1.

In FIG. 4 the audio interface 13 is shown. A radio transceiver 40 is interfaced to the bus system 10 by being assigned a receive and transmit audio time slot corresponding to a specific channel. The status of the associated radio channel is time-division multiplexed into the supervision digital bit stream while control flags are accepted from the signalling bit stream. Again a bus interface 41 buffers control and signalling information present on the bus system 10 synchronizing the incoming information via its latching action as already described in connection with the terminal interface 14. A circuit for signalling supervision 42 enters digital signalling bits serially into a signalling memory 43 where they are available for radio channel control. Again receive and transmit audio 44 and 45 access the assigned time-slot in half-duplex operation, where the push-to-talk signal controls the associated transceiver 40.

Figure 5:
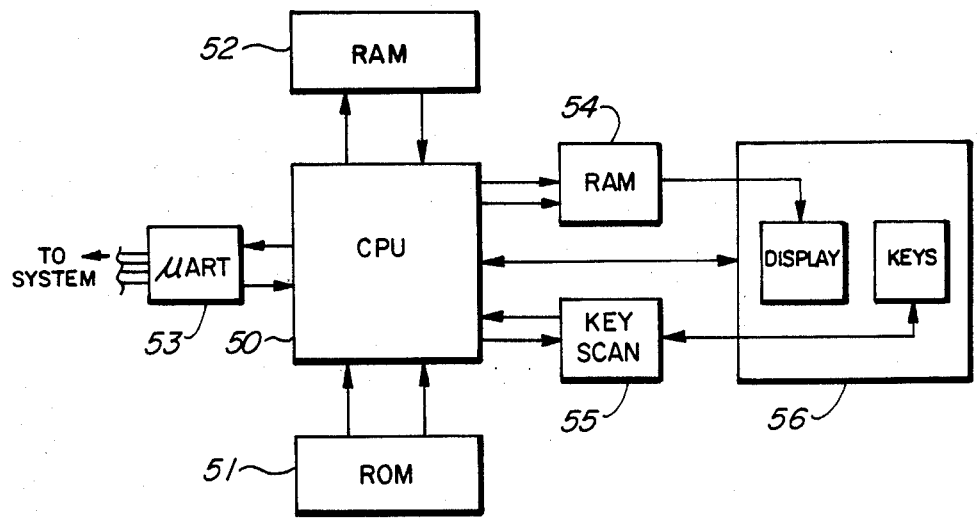
FIG. 5 is a block-diagram of the remote terminal of the system of FIG. 1.

The terminal equipment 15 is shown in FIG. 5. It comprises three basic circuit packs: a control circuit, a key/display circuit and, of course, an audio circuit. The control circuit comprises a microprocessor 50 operated at a 3.58 MHz master clock providing a timing cycle of 0.56 microseconds. The microprocessor 50 is instructed by a firmware memory 51, which is a six kilolyte ROM. Variable data is stored in RAM 52. The CPU 50 is an INTEL 8085A, the sanity of which is maintained by a time-out-circuit (not shown) that requires periodic triggering and is directly connected to the non-maskable interrupt of the CPU 50. Data interface is provided by a UART 53, which drives the 4-wire data line connecting the terminal to the system by means of differential line drivers (not shown). The UART 53 continuously receives and transmits data by periodically interrupting the CPU 50 to read and write the UART 53 buffers. A display memory 54 comprises four RAMs which provide a four-bit display "nibble" that determines the display symbol for the currently addressed display. By scanning the RAM 54 continuously multiplexed symbol images are displayed which are free of flicker. When any given memory symbol is to be modified the CPU 50 momentarily blanks the display and enters a new symbol "nibble" into the memory 54. A key scanner 55 scans the matrix of keys enabling a group of eight keys at a time; key groups are enabled in sequence. Any contact closure within a group appears at the respective bit position in the keyboard data byte. A key/display circuit 56 provides enable signals to display rows such that the bit pattern addressing the vertical bus can selectively display the symbol at the intersected display. The audio is received and transmitted via separate balanced lines and is multiplexed/demultiplexed in the terminal interface 14 shown in FIG. 3.

SYSTEM OPERATION

Figure 6:
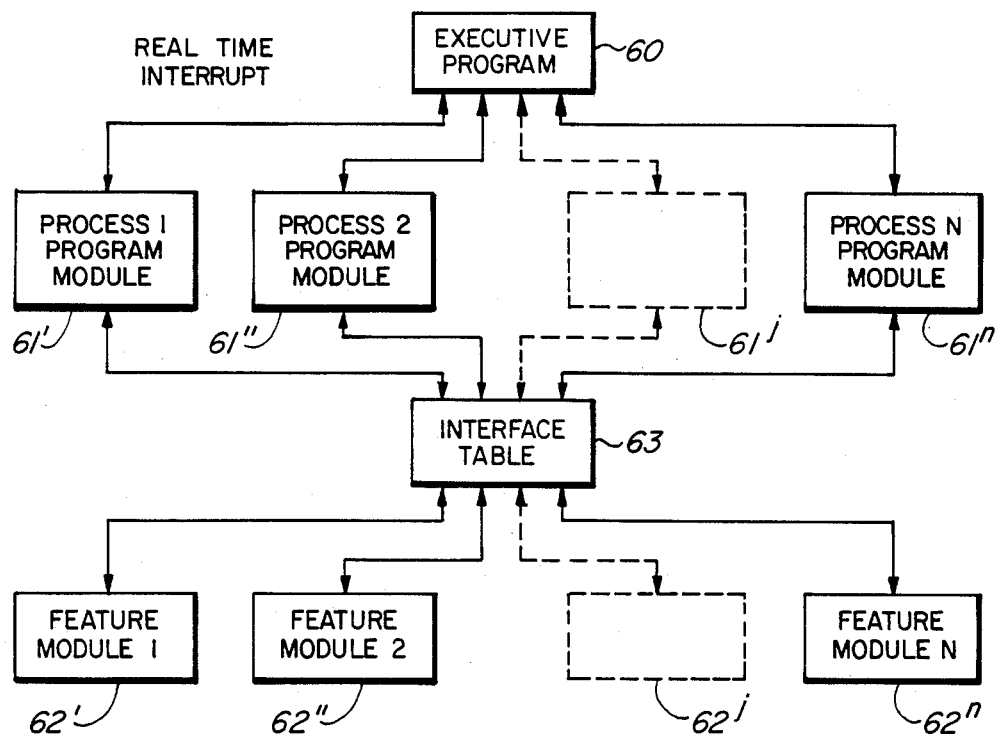
FIG. 6 is a flow chart showing an overview of the operating system of the common control subsystem of FIG. 2.

The real-time operating system shown in the flow chart in FIG. 6 is a microprocessor based system (located within each of the remote terminals 15 and 15') which interacts with its environment in a time scale dictated by the needs of that environment. The system is interfaced to the outside world by hardware communication and interface devices and responds to stimuli in a time range of milliseconds to seconds. The real time operating system is particularly suitable for the control of communication equipment, where a limited number of resources perform a multitude of tasks. Concurrent processing (running several processes simultaneously) makes optimum use of the available resources. The system implements concurrent processing by means of a time-sharing scheme. Each process has dedicated to it a certain fraction of system time. In this manner, each process is perceived as if it had a separate dedicated processor. Since peripheral devices are typically much slower than the processing system, for example a data channel, the system is used most effectively by running another program while waiting for the data channel to complete its task. As the data channel terminates its task an interrupt is sent to the processor and the current process is suspended while the processor handles the data channel originating the interrupt. The suspended process will thereafter resume execution. Deciding which program should run at a particular time is a function of an executive (or driver) program 60. Operation of the executive program 60 takes up a percentage of system and introduces an overhead which is unavoidable.

Figure 7:
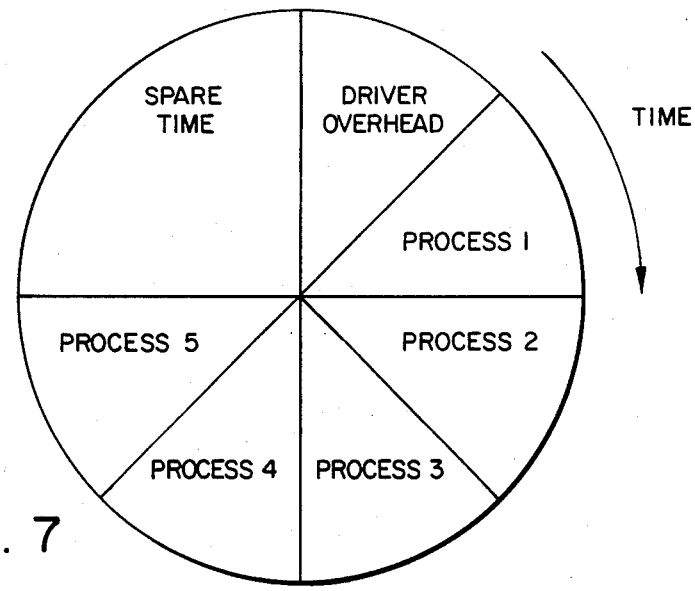
FIG. 7 illustrates the time-sharing scheme of the operating cycle of the operating system of FIG. 6.

Interrupts synchronize the system to its environment; they may be processed in the order they occur or be processed on a priority basis where the highest priority interrupt in a hierarchy is processed first. Each group of cooperating processes $61'$, $61''$ to $61^n$ is used to implement a certain software task. The processes $61'$, $61''$ to $61^n$ are independant of each other, and new processes may be added to the real-time operating system at will. The multi-task executive 60 is used to synchronize the operation of the processes $61'$ to $61^n$. The system is event driven as well as schedule driven. Interrupts from external hardware are events driving the system and overlap the system schedule shown in FIG. 7.

The executive program 60 uses a status byte EXSTA to indicate the order in which processes are to be run. The byte EXSTA may contain up to eight flags, one for each process. When a flag is active, it points to an address in one of the programs $61'$ to $61^n$ address tables. This address is the location of the stack pointer in the corresponding process program. The process programs $61'$ to $61^n$ are run in sequence. As an interupt from the external hardware occurs, it is stored in a request buffer until the process program $61^j$ necessary to handle that interrupt is reached. The processes $61'$ to $61^n$ are run on a ten millisecond schedule. The byte EXSTA is updated after each process program has been run.

Features modules $62'$, $62''$ to $62^n$ are provided to handle the different interrupts seen by each process program $61'$ to $61^n$. A typical application of a features module $61^j$ is to implement the various control functions originating from the keyboard 56 of the remote terminal 15.

Each of the process program modules $61'$ to $61^n$ contains data necessary for operation of the process. In a typical case the following data is stored:
 identification for process scheduling;
 indication whether process is currently running;
 an entry address to identify program location where execution starts;
 a stack pointer used to retrieve return addresses and register contents from stack;
 a stack (a block of memory where return addresses and register contents are stored for use by the process); and
 the actual process program.

The process program is re-entrant so that it continues running undisturbed when it has been reactivated after suspension. This requirement is met by storing the register contents and return address in the stack. The return address tells where the program should be re-entered after re-activation. Of course, several return addresses are necessary if the process program contains a number of subroutines, and nesting of subroutines demands a return address for each calling program. The stack is an ideal device for this as it is a last-in/first-out memory. Thus, the last return address will be the first read from the stack and the program will work its way back to the first subroutine call in an organized manner.

Features modules $62'$ to $62^n$ are program modules which are called by the process programs to perform a features-related function. As a result, the function of the real-time operating system can be altered by merely changing the features modules $62'$ to $62^n$. The executive program 60 and process program modules $61'$ to $61^n$ are designed to form the basis of a large number of desirable possible systems. The only difference between these systems is evoked and determined by the features-modules $62'$ to $62^n$. Hence, a programmer can modify the system without requiring detailed knowledge of the executive program 60 and the process program modules $61'$ to $61^n$. This makes the system available to a number of users with minimal alteration.

A feature module, say $62^j$, fulfills its function as follows. The process program module $61''$ will indicate that a particular function is to be performed. Through an interface table 63 the appropriate feature module (in this case $62^j$) will be called to perform this function. When completed, the feature module $62^j$ will return to the calling process through the interface table 63. An example of this is the key scan process, which identifies that a particular key has been activated. The address (i.e. identity) of the activated key will be used to identify which feature module is to be called and the latter is called through the interface table 63. The interface table 63 allows several processes to share common feature modules. The feature module then performs the function (such as monitor on the room loudspeaker) which the key was used to initiate by the operator. Execution will then return to the calling process through the interface table. Accordingly, the function of a key may be redefined by changing its feature module.

By way of further explanation of feature modules' function, the basic radio control features will be described. Entry to the basic radio control features module, say $62^j$, is made by executing a call from the key scan process program module, say $61^n$, or from the incoming data through the radio interface 13. Calls from the feature module are made through the interface table which identifies a series of subroutines located within the process program modules $61'$ to $61^n$. Upon completing a sub-routine in a process program module, a return is made to the feature module. Additional subroutine calls to other processes take place within the feature's implementation algorithm of the feature module. Upon completing a feature module algorithm a return to the original calling process is executed.

Typical operation is illustrated by following the sequence of events that take place upon the operation of a radio channel select key. The keyboard is periodically scanned by the key scan process which thus detects the activation by an operator of a channel select key. The process uses an address RFKEY located within the key vector table in order to execute a subroutine call to the subroutine RFKEY located in the basic radio control feature module $62^j$. The status of the radio channel state corresponding to the activated key number is used to determine the functional algorithm to be executed. For example, operating the select key for an idle radio channel the functional algorithm is "select request program commencing at address RFK$\phi$2". The radio channel status table is updated to the select state and the feature module executes a call to a data out subroutine in the data out handling process in one of the modules $61'$ to $61^n$. The address of that subroutine is available at a corresponding location of a subroutine address table. When the data out subroutine has been completed, a return is made to the feature module $62^j$. The feature module determines the display code associated with the channel and executes a call to the multiplexed display process subroutine. The associated subroutine address was found from the subroutine address table. When the display subroutine of the multiplexed display process has modified the channel display in the remote terminals 15, 15', etc., a return is made to the feature module $62^j$. As the feature module $62^j$ has transferred a data transmit request and has updated the channel display, its operation is now terminated by executing a return to the key scan process which had originated the sequence of subroutines. The key scan process continues to scan for other key activations until it is suspended.

Other processes within any of the process program modules $61'$ to $61^n$ and features within the feature modules $62'$ to $62^n$ operate in like manner.

What is claimed is:

1. A communication switching system comprising:
   (a) a central network bus;
   (b) common control means;
   (c) a plurality of interface means for interfacing at least one operator position terminal and a plurality of auxiliary circuit terminations to one another and with said common control means;
   (d) said central network bus interconnecting said plurality of interface means according to periodically generated address codes;
   (e) said plurality of interface means providing time division multiplexed representations of signals originating from associated auxiliary circuit terminations on said central network bus for direct access thereto by other interface means; and
   (f) said operator position terminal comprising a microprocessor system adapted to respond to incoming data into the terminal and to commands from a keyboard of the terminal by periodically updating a display on the terminal and by updating connection memories for identifying connections of said auxiliary circuit terminations to other system components.

2. The communication switching system as defined in claim 1, said time division multiplexed representations being pulse amplitude modulation signals.

3. The communication switching system as defined in claim 1, said microprocessor system adapted to select at least one of a plurality of programmed feature modules in response to an internal command originating in one of a plurality of process program modules, each said process program module defining a predetermined interface procedure with a corresponding one of said auxiliary circuit terminations.

4. The communication switching system as defined in claim 2, said microprocessor system adapted to select at least one of a plurality of programmed feature modules in response to an internal command originating in one of a plurality of process program modules, each said process program module defining a predetermined interface procedure with a corresponding one of said auxiliary circuit terminations.

5. The communication switching system as defined in claim 1, said microprocessor system adapted to select at least one of a plurality of programmed feature modules in response to an internal command originating in one of a plurality of process program modules, each said process program module defining a predetermined interface procedure with a corresponding one of said auxiliary circuit terminations; and said microprocessor system selecting said one of a plurality of programmed feature modules by means of a fixed interface table adapted to permit access to any one of said feature modules.

6. The communication switching system as defined in claim 2, said microprocessor system adapted to select at least one of a plurality of programmed feature modules in response to an internal command originating in one of a plurality of process program modules, each said process program module defining a predetermined interface procedure with a corresponding one of said auxiliary circuit terminations; and said microprocessor system selecting said one of a plurality of programmed feature modules by means of a fixed interface table adapted to permit access to any one of said feature modules.

7. The communication switching system as defined in claim 1, said common control means being a hardwired timing and logic means.

8. The communication switching system as defined in claim 1, said common control means being a hardwired timing and logic means.

9. The communication switching system as defined in claim 2, said common control means being a hardwired timing and logic means.

10. The communication switching system as defined in claim 2, said auxiliary circuit terminations being voice circuit terminations terminating telephone lines and trunks, and radio transcievers.

11. The communication switching system as defined in claim 1, said auxiliary circuit terminations being voice circuit terminations terminating telephone lines and trunks, and radio transcievers.

12. The communication switching system as defined in claim 3, said auxiliary circuit terminations being voice circuit terminations terminating telephone lines and trunks, and radio transcievers.

* * * * *